3,443,690
FILTERING APPARATUS
Josef Triesch, Dusseldorf-Rath, Germany, assignor to Maschinenfabrik Sack G.m.b.H., Dusseldorf-Rath, Germany
Filed Aug. 8, 1968, Ser. No. 751,301
Claims priority, application Germany, Aug. 12, 1967, M 59,698
Int. Cl. B01d 35/16, 35/00
U.S. Cl. 210—95    5 Claims

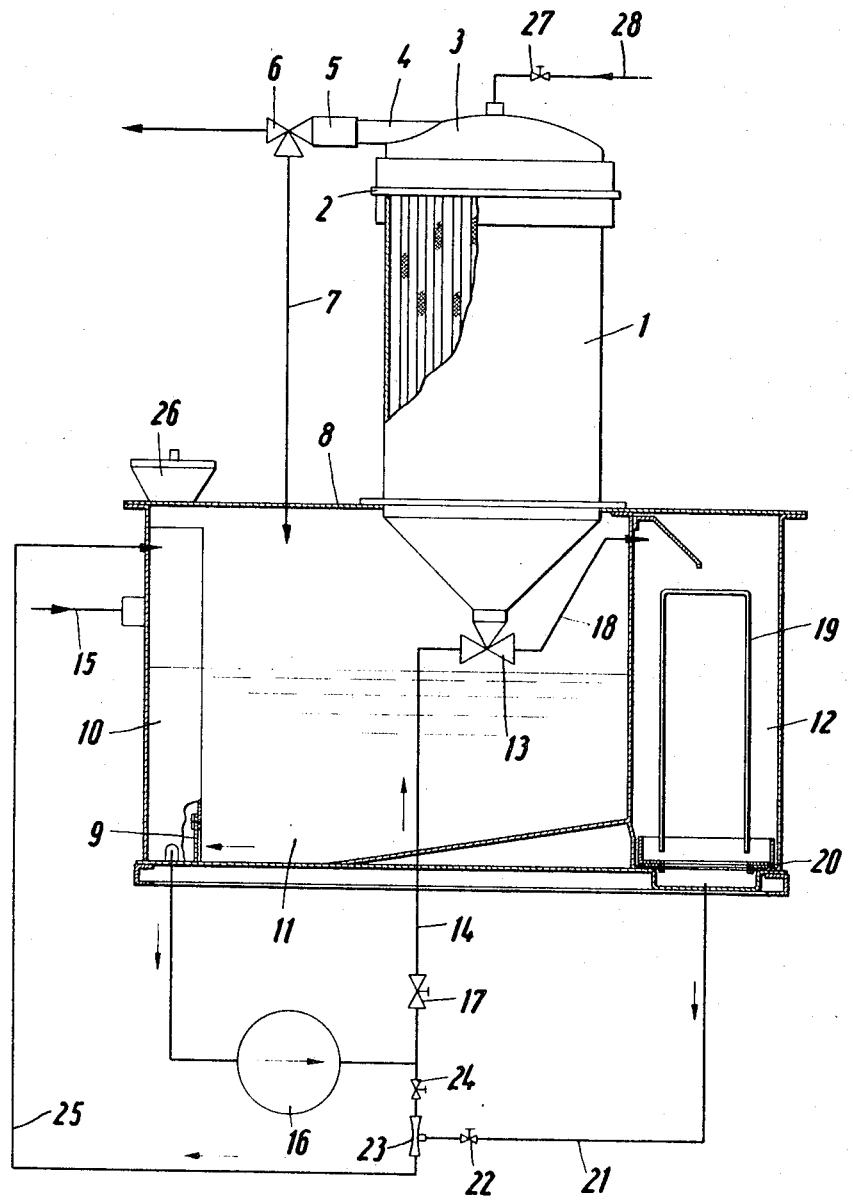

ABSTRACT OF THE DISCLOSURE

Filtering apparatus has a filter chamber with a filter element through which oil is pumped from an input chamber to remove entrained solids. A three-way valve at an input end of the filter chamber enables caked solids, dislodged from the filter element by a reverse flow of compressed air, together with oil from the filter chamber to pass to a sedimentation chamber in which a sieve retains the caked solids and from which the oil is drawn by an injector mounted in a bypass line leading from the pump to the input chamber.

---

The invention relates to filtering apparatus for cleaning liquids, for example cutting oils, which are soiled with solids.

For cleaning liquids settling filters are often used consisting of a cylindrical pressure container which is conical at its lower end. The cylindrical container is divided into two chambers by a filter, for example a perforated candle plate, the container chamber lying above the candle plate usually being connected through a clean liquid conduit with the user and the container chamber lying below the candle plate being connected to a dirty liquid conduit. The filter candles, consisting of gauze, are suspended in the individual holes of the candle plate and before starting filtration, a filter layer in the form of a finely dispersed suspension, for example of siliceous material, is applied to their coarse-meshed gauze.

Filtration takes place through a filter cake of increasing thickness as a result of the progressive settling of the solids situated in the dirty liquid. The growth of the filter cake generally involves an appreciable loss of porosity of the filtering layer, so that substances which increase or maintain the porosity of the filter cake must frequently be added to the dirty liquid flowing into the pressure container from beneath.

The oil or other liquid to be cleaned penetrates the filter candles, from the exterior inwards and passes out of a chamber lying above the filter or candle plate.

Despite the addition of porosity-increasing filter aids the constant growth of the filter layer leads to a progressively reduced flow of filtrate which finally is no longer sufficient for the supply to the user. For this reason it is necessary periodically to free the filter cake from the filter candles, such as by introducing a reversed flow of a washing medium or of compressed air. The detached filter cake, with the washing medium if used, is discarded or passes into a sedimentation container in which the solid particles settle on the bottom. As soon as the sedimentation is substantially concluded the washing liquid above it can be withdrawn by means of a pump and used again.

Known filtration apparatus is complicated and bulky, consisting of several separate containers and at least three different pumps, for conveying the dirty oil, for initially applying the filter layer and for pumping excess washing liquid out of the sedimentation container.

In accordance with the present invention, apparatus for cleaning liquid comprises a filter chamber which has an inlet and an outlet, a dirty liquid chamber, a sedimentation chamber across which a sieve is mounted, a pump which is arranged to deliver liquid from the dirty liquid chamber to a valve having three ways which are connected respectively to the pump, the filter chamber inlet and the sedimentation chamber on one side of the sieve, and having two positions in one of which the filter chamber communicates with the pump and in the other of which the filter chamber communicates with the sedimentation chamber, and an injector having a suction-pipe connected to the sedimentation chamber on the other side of the sieve, an inlet connected to a delivery pipe of the pump and an outlet connected to the dirty liquid chamber. The use of a single pump in conjunction with the three way valve and the injector enables the apparatus to be compact and simple.

To clean a filter cake from the filter chamber, the three-way valve is set to admit liquid and deposited solids from the filter chamber to the sedimentation chamber, the liquid being forced downwards through the filter chamber by, for example, the admission of compressed air to an upper end of the filter chamber. The valve is then returned to a position in which liquid is admitted from the pump to the lower end of the filter chamber while the liquid in the sedimentation chamber is withdrawn from the solids, which are trapped on the sieve, by the injector. The sieve is preferably easily removable, and may have a handle, so that it can be withdrawn and the solids on it discarded. It is an advantage that substantially no liquid is wasted.

Preferably, the apparatus includes both a return chamber communicating with the dirty liquid chamber through a non return valve and a second three way valve at the outlet of the filter chamber having two positions in one of which the filter chamber outlet communicates with a return conduit leading to the return chamber and in the other of which the filter chamber outlet communicates with a user conduit. Before beginning filtration, a filter layer in the form of a finely dispersed suspension can be deposited on gauze filters in the filter chamber by introducing finely divided material into the dirty liquid chamber, for example from a metering hopper, and setting the second three way valve so that liquid delivered from the filter chamber passes directly to the return chamber. After deposition of the filter layer, the second three way valve is operated to open the user conduit and close the return conduit.

In order to determine when the filter layer has been established, an inspection glass can be arranged between the filter chamber and the second three way valve. Finally, shutoff valves are preferably arranged between the sedimentation chamber and the injector, between the pump and the three way valve and between the pump and the injector.

One example of apparatus in accordance with the invention for cleaning cutting oil is illustrated in the accompanying diagrammatic drawing.

The apparatus comprises a conventional settling filter chamber 1 which is divided by a candle plate 2 fitted with numerous filter candles. A clean oil conduit 4, in which an inspection glass 5 is arranged for observation of the passage of oil, issues from a chamber 3 lying above the candle plate 2. The clean oil conduit 4 leads by way of a three-way valve 6 either to the user or, by way of a return conduit 7, to a multichamber container 8 on which the settling filter chamber 1 is mounted. The multi-chamber container 8 consists of a dirty oil chamber 10, a return chamber 11 and a sedimentation chamber 12.

A part of the filter chamber 1 lying beneath the candle plate has a conical lower part which is connected through a three-way valve 13 and a conduit 14 with the dirty oil chamber 10. To force the dirty oil, entering through a dirty oil conduit 15 into the dirty oil chamber 10, through the filter layer of the filter chamber 1, a circulation pump 16, for example a submersible pump, lies in the conduit 14, after which pump a shutoff valve 17 is arranged. The third way of the three-way valve 13 is connected with a conduit 18 opening into the sedimentation chamber 12.

The sedimentation chamber 12 is divided by a sieve 20 provided with a handle 19, the chamber lying beneath the sieve being connected through a conduit 21 and a shutoff valve 22 with the suction pipe of an injector 23 of which an inlet side is connected through a shutoff valve 24 to the delivery pipe of the circulation pump 16, and a delivery pipe opens by way of a conduit 25 into the dirty oil chamber 10. Finally, above the dirty oil chamber 10 a quantity-regulation hopper 26 is arranged for the introduction of a filtering aid for the buildup of the filter layer. The upper chamber 3 of the settling filter 1 is connected by way of a shutoff valve 27 to a compressed air conduit 28.

In a settling of a filter layer on the filter candles, a filter aid, for example siliceous material, is added through the quantity-regulating hopper 26 into the dirty oil chamber 10, which is connected through a nonreturn valve 9 with the return chamber 11. From the dirty oil chamber 10 the filter aid, finely dispersed in the dirty oil, passes by way of the circulation pump 16, the conduit 14 and the three-way valve 13 into the lower chamber of the filter chamber 1. The filter aid is deposited on the relatively coarse gauze of the filter candles, while the oil passes, more or less thoroughly cleaned, into the upper chamber 3 of the filter chamber and thence through the clean oil conduit 4, the three-way valve 6 and the return conduit 7 into the return chamber 11. As soon as a sufficiently thick filter layer is situated on the sieve gauze of the filter candles, the three-way valve 6 is moved over towards the user and thus the return conduit 7 is shut off. Since now no more filter aid is added to the dirty oil through the quantity-regulating hopper 26, the soiled oil entering the dirty oil chamber 10 through the conduit 15 will be continuously filtered and fed to the user.

As soon as the supply of clean oil to the user is no longer adequate or a predetermined maximum pressure prevails in the lower chamber of the filter chamber 1, the pump 16 is shut off. The clean oil conduit 4 and the return conduit 7 are also shut off by shifting over the three-way valve 6 and the lower chamber of the filter 1 is connected through the conduit 18 with the sedimentation chamber 12 by operation of the three-way valve 13. Due to opening of the shutoff valve 27 a compressed air surge passes from the compressed air conduit 28 into the upper chamber 3 of the filter chamber and forces the clean oil present there downwards through the filter candles so that the filter cake on the filter candles is dislodged and passes by way of the three-way valve 13 and the conduit 18 into the sedimentation chamber 12. After closure of the shutoff valve 27 and shifting over of the three-way valves 6 and 13 and switching-on of the circulation pump 16, filtering aid for the settlement of a filter layer is again added into the quantity-regulating hopper 26, whereafter the working cycle as described above is repeated.

After the three-way valve 6 has been shifted over again to the user, the shutoff valves 22 and 24 are opened so that the oil in the upper part of the sedimentation chamber 12 is sucked away through the injector 23 and fed through the conduit 25 into the dirty oil chamber 10. A nearly dry cake is left above the sieve 20, and can be removed from the sedimentation chamber 12 without difficulty by lifting out the sieve.

Although the invention has been described with reference to apparatus for the cleaning of cutting oil, it can equally be used in the cleaning of any other liquid.

The drawing shows the various parts of the apparatus as being separated from each other, for the sake of clarity of illustration. In practice it is naturally desirable that the apparatus should be made as compact as possible.

I claim:
1. Filtering apparatus comprising a filter chamber, inlet and outlet portions in said filter chamber, filter means mounted in said filter chamber between said inlet and outlet portions, an input chamber adapted to contain liquid to be filtered, a pump operably connected between said input chamber and said filter chamber and adapted to deliver liquid from said input chamber to said filter chamber, a sedimentation chamber, inlet and outlet portions in said sedimentation chamber, sieve means mounted across said sedimentation chamber between said inlet and outlet portions, a three-way, two-position valve, a first way of said valve operably connected to said inlet of said filter chamber, a second way of said valve operably connected to said pump and a third way of said valve operably connected to said inlet of said sedimentation chamber, said valve being adapted in a first position to communicate said second way to said first way and in a second position to communicate said third way to said first way, injector means, a suction pipe of said injector means operably connected to said outlet portion of said sedimentation chamber, an inlet pipe of said injector means operably connected to said pump, and an outlet pipe of said injector means operably connected to said input chamber.

2. Filtering apparatus in accordance with claim 1, further including a return chamber, a nonreturn valve interposed between said return chamber and said input chamber, a user conduit, a second three-way, two-position valve, a first way of said second valve operably connected to said outlet portion of said filter chamber, another way of said second valve operably connected to said return chamber and a third way of said second valve operably connected to said user conduit, said valve being adapted in a first position to communicate said first way to said second way and in a second position to communicate said first way to said third way.

3. Filtering apparatus in accordance with claim 2, wherein a metering hopper is provided above said input chamber whereby additives may be introduced into said input chamber in metered amounts.

4. Filtering apparatus in accordance with claim 3, wherein an inspection glass is provided in said outlet portion of said filter chamber and three shutoff valves are interposed between said sedimentation chamber and said injector, between said pump and said first mentioned three way valve and between said pump and said injector respectively.

5. Apparatus in accordance with claim 4, wherein said sieve means is releasably mounted across said sedimentation chamber and a handle is provided on said sieve.

References Cited
UNITED STATES PATENTS

| | | | |
|---|---|---|---|
| 2,828,862 | 4/1958 | Johnson | 210—167 X |
| 3,037,635 | 6/1962 | Boorujy | 210—193 X |
| 3,089,325 | 5/1963 | Robbins et al. | 210—333 X |
| 3,389,081 | 6/1968 | Eckenfelder et al. | 210—193 X |

REUBEN FRIEDMAN, *Primary Examiner.*

J. L. DE CESARE, *Assistant Examiner.*

U.S. Cl. X.R.

210—167, 193, 333